(12) United States Patent
Wenren et al.

(10) Patent No.: US 12,105,356 B2
(45) Date of Patent: Oct. 1, 2024

(54) OPTICAL IMAGING LENS ASSEMBLY

(71) Applicant: Zhejiang Sunny Optics Co., Ltd., Yuyao (CN)

(72) Inventors: Jianke Wenren, Yuyao (CN); Liefeng Zhao, Yuyao (CN); Fujian Dai, Yuyao (CN)

(73) Assignee: Zhejiang Sunny Optics Co., Ltd., Yuyao (CN)

( * ) Notice: Subject to any disclaimer, the term of this patent is extended or adjusted under 35 U.S.C. 154(b) by 478 days.

(21) Appl. No.: 17/646,506

(22) Filed: Dec. 30, 2021

(65) Prior Publication Data
US 2022/0252831 A1 Aug. 11, 2022

(30) Foreign Application Priority Data
Jan. 25, 2021 (CN) .......................... 202110098622.2

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC .............................. G02B 9/64; G02B 13/0045
USPC ......................................................... 359/755
See application file for complete search history.

(56) References Cited

U.S. PATENT DOCUMENTS

| | | | |
|---|---|---|---|
| 2015/0070783 A1* | 3/2015 | Hashimoto | G06T 5/70 359/708 |
| 2016/0033742 A1* | 2/2016 | Huang | G02B 13/0045 359/708 |
| 2016/0241756 A1* | 8/2016 | Chen | G02B 13/0045 |
| 2017/0108663 A1* | 4/2017 | Sekine | G02B 9/64 |
| 2017/0276910 A1* | 9/2017 | Chen | G02B 13/0045 |
| 2018/0321471 A1* | 11/2018 | Chen | G02B 9/64 |

* cited by examiner

*Primary Examiner* — William R Alexander
*Assistant Examiner* — Sharrief I Broome
(74) *Attorney, Agent, or Firm* — Sughrue Mion, PLLC

(57) ABSTRACT

An optical imaging lens assembly is provided, which includes, a first lens having a negative refractive power; a second lens having a positive refractive power; a third lens; a fourth lens having a positive refractive power; a fifth lens having a negative refractive power; a sixth lens having a positive refractive power; and a seventh lens with a convex object-side surface. An axial distance TTL from an object-side surface of the first lens to an imaging plane of the optical imaging lens assembly and a half of a maximal field-of-view Semi-FOV of the optical imaging lens assembly satisfy: TTL/Tan(Semi-FOV)<1.0 mm; and a total effective focal length f of the optical imaging lens assembly, a radius of curvature R11 of an object-side surface of the sixth lens and a radius of curvature R12 of an image-side surface of the sixth lens satisfy: −5.0<f/(R11−R12)<−2.0.

13 Claims, 5 Drawing Sheets

OPTICAL IMAGING LENS ASSEMBLY

CROSS-REFERENCE TO RELATED APPLICATIONS

This application claims benefit of priority to Chinese Patent Application No. 202110098622.2 filed on Jan. 25, 2021 before the China National Intellectual Property Administration, the entire disclosure of which is incorporated herein by reference in its entity.

TECHNICAL FIELD

The present disclosure relates to the field of optical elements, and more specifically, relates to an optical imaging lens assembly.

BACKGROUND

In recent years, portable electronic products with camera functions have gradually emerged. Lens assemblies are used as an important part of camera systems, and their imaging qualities have received more and more attention.

With the rapid development of camera systems for portable electronic products, higher requirements are set for optical imaging lens assemblies. In order to provide users with high-quality camera functions in an all-round way, large field-of-view optical imaging lens assemblies with higher imaging qualities have become a trend in lens assembly development. Wide-angle lens assemblies have the characteristics of large field-of-view and long depth of field, which can easily bring a sense of perspective to photographers and enhance the appeal of pictures. However, the wide-angle lens assemblies usually have imaging quality problems such as large vertical chromatic aberrations, resulting in poor imaging effects. How to achieve the ultra wide-angles of the lens assemblies while improving the image qualities is one of the urgent problems to be solved in the lens assembly field.

SUMMARY

The present disclosure provides an optical imaging lens assembly, which includes, sequentially from an object side to an image side along an optical axis, a first lens having a negative refractive power; a second lens having a positive refractive power; a third lens; a fourth lens having a positive refractive power; a fifth lens having a negative refractive power; a sixth lens having a positive refractive power; and a seventh lens with a convex object-side surface. An axial distance TTL from an object-side surface of the first lens to an imaging plane of the optical imaging lens assembly and a half of a maximal field-of-view Semi-FOV of the optical imaging lens assembly may satisfy: TTL/Tan(Semi-FOV) <1.0 mm; and a total effective focal length f of the optical imaging lens assembly, a radius of curvature R11 of an object-side surface of the sixth lens and a radius of curvature R12 of an image-side surface of the sixth lens may satisfy: $-5.0<f/(R11-R12)<-2.0$.

In some embodiments, an effective focal length f7 of the seventh lens and an effective focal length f6 of the sixth lens may satisfy: $1.0<f7/f6<2.0$.

In some embodiments, an effective focal length f2 of the second lens and an effective focal length f1 of the first lens may satisfy: $-3.5<f2/f1\leq-3.0$.

In some embodiments, the total effective focal length f of the optical imaging lens assembly, an effective focal length f4 of the fourth lens and an effective focal length f5 of the fifth lens may satisfy: $-2.5<f/(f4+f5)<-2.0$.

In some embodiments, an effective focal length f2 of the second lens, a radius of curvature R3 of an object-side surface of the second lens and a radius of curvature R4 of an image-side surface of the second lens may satisfy: $-1.5<f2/(R3+R4)<-0.8$.

In some embodiments, the total effective focal length f of the optical imaging lens assembly, an axial center thickness CT2 of the second lens and an axial center thickness CT4 of the fourth lens may satisfy: $4.5<f/CT2+f/CT4<5.5$.

In some embodiments, the total effective focal length f of the optical imaging lens assembly and a spaced interval T45 between the fourth lens and the fifth lens on the optical axis may satisfy: $2.5<f/T45<3.5$.

In some embodiments, the total effective focal length f of the optical imaging lens assembly and an axial center thickness CT7 of the seventh lens may satisfy: $1.5<f/CT7<2.5$.

In some embodiments, an effective focal length f1 of the firth lens and a radius of curvature R1 of an object-side surface of the first lens may satisfy: $0<f1/R1<0.2$.

In some embodiments, a radius of curvature R10 of an image-side surface of the fifth lens and a radius of curvature R9 of an object-side surface of the fifth lens may satisfy: $-3.0<R10/R9<-2.0$.

In some embodiments, the total effective focal length f of the optical imaging lens assembly, a radius of curvature R5 of an object-side surface of the third lens and a radius of curvature R6 of an image-side surface of the third lens may satisfy: $11<f/(R5-R6)<15$.

In some embodiments, an effective radius DT11 of an object-side surface of the first lens and an entrance pupil diameter EPD of the optical imaging lens assembly may satisfy: $2.5<DT11/EPD<3.5$.

The present disclosure further provides an optical imaging lens assembly, which includes, sequentially from an object side to an image side along an optical ax is, a first lens having a negative refractive power; a second lens having a positive refractive power; a third lens; a fourth lens having a positive refractive power; a fifth lens having a negative refractive power; a sixth lens having a positive refractive power; and a seventh lens with a convex object-side surface. An axial distance TTL from an object-side surface of the first lens to an imaging plane of the optical imaging lens assembly and a half of a maximal field-of-view Semi-FOV of the optical imaging lens assembly may satisfy: TTL/Tan(Semi-FOV)<1.0 mm; and an effective focal length f2 of the second lens and an effective focal length f1 of the first lens may satisfy: $-3.5<f2/f1\leq-3.0$.

In some embodiments, an effective focal length f7 of the seventh lens and an effective focal length f6 of the sixth lens may satisfy: $1.0<f7/f6<2.0$.

In some embodiments, a total effective focal length f of the optical imaging lens assembly, a radius of curvature R11 of an object-side surface of the sixth lens and a radius of curvature R12 of an image-side surface of the sixth lens may satisfy: $-5.0<f/(R11-R12)<-2.0$.

In some embodiments, a total effective focal length f of the optical imaging lens assembly, an effective focal length f4 of the fourth lens and an effective focal length f5 of the fifth lens may satisfy: $-2.5<f/(f4+f5)<-2.0$.

In some embodiments, the effective focal length f2 of the second lens, a radius of curvature R3 of an object-side surface of the second lens and a radius of curvature R4 of an image-side surface of the second lens may satisfy: $-1.5<f2/(R3+R4)<-0.8$.

In some embodiments, a total effective focal length f of the optical imaging lens assembly, an axial center thickness CT2 of the second lens and an axial center thickness CT4 of the fourth lens may satisfy: $4.5 < f/CT2 + f/CT4 < 5.5$.

In some embodiments, a total effective focal length f of the optical imaging lens assembly and a spaced interval T45 between the fourth lens and the fifth lens on the optical axis may satisfy: $2.5 < f/T45 < 3.5$.

In some embodiments, a total effective focal length f of the optical imaging lens assembly and an axial center thickness CT7 of the seventh lens may satisfy: $1.5 < f/CT7 < 2.5$.

In some embodiments, the effective focal length f1 of the fifth lens and a radius of curvature R1 of an object-side surface of the first lens may satisfy: $0 < f1/R1 < 0.2$.

In some embodiments, a radius of curvature R10 of an image-side surface of the fifth lens and a radius of curvature R9 of an object-side surface of the fifth lens may satisfy: $-3.0 < R10/R9 < -2.0$.

In some embodiments, a total effective focal length f of the optical imaging lens assembly, a radius of curvature R5 of an object-side surface of the third lens and a radius of curvature R6 of an image-side surface of the third lens may satisfy: $11 < f/(R5-R6) < 15$.

In some embodiments, an effective radius DT11 of the object-side surface of the first lens and an entrance pupil diameter EPD of the optical imaging lens assembly may satisfy: $2.5 < DT11/EPD < 3.5$.

The present disclosure adopts a seven-piece lens assembly structure. By reasonably distributing the refractive power, surface type, center thickness of each lens and the axial distances between the lenses, the optical imaging lens assembly has at least one of the beneficial effects of a large filed-of-view and a high imaging quality.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings.

DETAILED DESCRIPTION OF EMBODIMENTS

Figure 1:
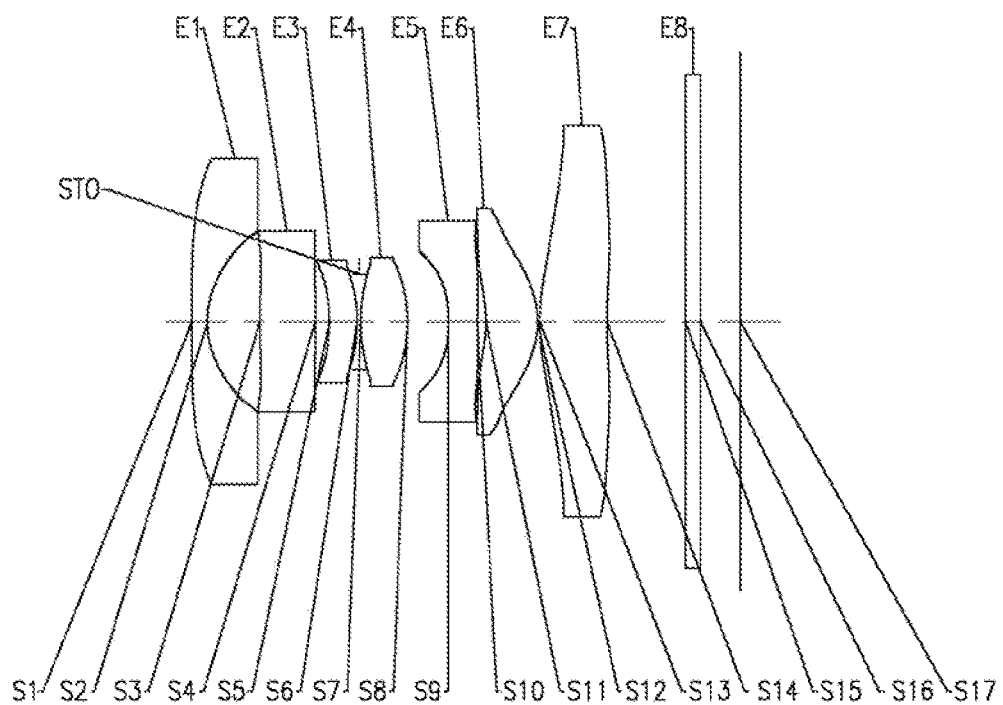
FIG. 1 is a schematic structural diagram showing an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, without departing from the teachings of the present disclosure, a first lens discussed below may also be referred to as a second lens or a third lens.

In the accompanying drawings, the thickness, size and shape of the lens have been somewhat exaggerated for the convenience of explanation. In particular, shapes of spherical surfaces or aspherical surfaces shown in the accompanying drawings are shown by way of example. That is, shapes of the spherical surfaces or the aspherical surfaces are not limited to the shapes of the spherical surfaces or the aspherical surfaces shown in the accompanying drawings. The accompanying drawings are merely illustrative and not strictly drawn to scale.

Herein, the paraxial area refers to an area near the optical axis. If a surface of a lens is a convex surface and the position of the convex surface is not defined, it indicates that the surface of the lens is convex at least in the paraxial region. If a surface of a lens is a concave surface and the position of the concave surface is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, seven lenses having refractive powers, which are a first lens, a second lens, a third lens, a fourth lens, a fifth lens, a sixth lens, and a seventh lens respectively. The seven lenses are sequentially arranged from an object side to an image side along an optical axis. Among the first lens to the seventh lens, there may be a spaced interval between any two adjacent lenses.

In an exemplary embodiment, the first lens may have a negative refractive power; the second lens may have a positive refractive power; the third lens may have a positive or negative refractive power; the fourth lens may have a positive refractive power; the fifth lens may have a negative refractive power; the sixth lens may have a positive refractive power; and the seventh lens may have a positive or negative refractive power. By reasonably distributing the positive or negative refractive power of each lens of the optical imaging lens assembly, the imaging quality of the optical imaging lens assembly can be effectively improved.

In an exemplary embodiment, the optical imaging lens assembly may satisfy: TTL/Tan(Semi-FOV)<1.0 mm, where TTL is an axial distance from an object-side surface of the first lens to an imaging plane of the optical imaging lens assembly and Semi-FOV is a half of a maximal field-of-view of the optical imaging lens assembly. Specifically, TTL and Semi-FOV may satisfy: TTL/Tan(Semi-FOV)<0.90 mm.

In an exemplary embodiment, the optical imaging lens assembly may satisfy: −5.0<C(R11−R12)<−2.0, where f is a total effective focal length of the optical imaging lens assembly, R11 is a radius of curvature of an object-side surface of the sixth lens and R12 is a radius of curvature of an image-side surface of the sixth lens. The optical imaging lens assembly satisfies: −5.0<f/(R11−R12)<−2.0, which can maintain a smooth transition of lights, which is conducive to increasing the field-of-view of the optical imaging lens assembly, so that the optical imaging lens assembly can obtain more scenes while being used for shooting. More specifically, f, R11 and R12 may satisfy: −3.0</(R11−R12)<−2.0.

In an exemplary embodiment, the optical imaging lens assembly may satisfy: 1.0<f7/f6<2.0, where f7 is an effective focal length of the seventh lens and f6 is an effective focal length of the sixth lens. Reasonably distributing the refractive powers of the sixth lens and the seventh lens is conducive to optimizing the axial spherical aberration of the optical imaging lens assembly. More specifically, f7 and f6 may satisfy: 1.50≤f7/f6<2.0.

In an exemplary embodiment, the optical imaging lens assembly may satisfy: −3.5<2/f1≤−3.0, where f2 is an effective focal length of the second lens and f1 is an effective focal length of the first lens. Reasonably distributing the refractive powers of the first lens and the second lens is conducive to optimizing the vertical chromatic aberration of the optical imaging lens assembly, reducing the sensitivity of the second lens assembly, and optimizing the shape of the first lens. More specifically, f2 and f1 may satisfy: −3.4<f2/f1≤−3.0.

In an exemplary embodiment, the optical imaging lens assembly may satisfy: −2.5</(f4+f5)<−2.0, where f is a total effective focal length of the optical imaging lens assembly, f4 is an effective focal length of the fourth lens and f5 is an effective focal length of the fifth lens. The optical imaging lens assembly satisfies: −2.5<f/(f4+f5)<−2.0, which can effectively reduce the decentering sensitivities of the fourth lens and the fifth lens.

In an exemplary embodiment, the optical imaging lens assembly may satisfy: −1.5<f2/(R3+R4)<−0.8, where f2 is an effective focal length of the second lens, R3 is a radius of curvature of an object-side surface of the second lens and R4 is a radius of curvature of an image-side surface of the second lens. The optical imaging lens assembly satisfies: −1.5<2/(R3+R4)<−4.8, which is conducive to optimizing the shape of the second lens and at the same time can correct the axial chromatic aberration of the optical imaging lens assembly. More specifically, f2, R3 and R4 may satisfy: −1.2<f2/(R3+R4)<−0.8.

In an exemplary embodiment, the optical imaging lens assembly may satisfy: 4.5<f/CT2+f/CT4<5.5, where f is a total effective focal length of the optical imaging lens assembly, CT2 is an axial center thickness of the second lens and CT4 is an axial center thickness of the fourth lens. The optical imaging lens assembly satisfies: 4.5<f/CT2+f/CT4<5.5, which helps to control a ghost image caused by a mutual reflection of lights between the second lens and the fourth lens, so as to reduce an intensity of the ghost image. More specifically, f, CT2 and CT4 may satisfy: 4.7<f/CT2+f/CT4<5.4.

In an exemplary embodiment, the optical imaging lens assembly may satisfy: 2.5<f/T45<3.5, where f is a total effective focal length f of the optical imaging lens assembly and T45 is a spaced interval between the fourth lens and the fifth lens on the optical axis. The optical imaging lens assembly satisfies: 2.5<f/T45<3.5, which helps to make the optical imaging lens assembly have a characteristic of miniaturization, thereby expanding an application scope of the optical imaging lens assembly. More specifically, f and T45 may satisfy 2.9<f/T45<3.4.

In an exemplary embodiment, the optical imaging lens assembly may satisfy: 1.5<f/CT7<2.5, where f is a total effective focal length of the optical imaging lens assembly and CT7 is an axial center thickness of the seventh lens. The optical imaging lens assembly satisfies: 1.5<f/CT7<2.5, which can increase the strength of the seventh lens, improve the process performance, and reduce the deformation degrees of the lenses after the optical imaging lens assembly is set up, so as to improve an assembly yield. More specifically, f and CT7 may satisfy: 1.8<f/CT7<2.2.

In an exemplary embodiment, the optical imaging lens assembly may satisfy: 0<f1/R1<0.2, where f1 is an effective focal length of the firth lens and R1 is a radius of curvature of an object-side surface of the first lens. Reasonably controlling the shape of the first lens is conducive to making the optical imaging lens assembly have a larger field-of-view, reducing the refractive power of the first lens, and reducing the sensitivity of the first lens. More specifically, f1 and R1 may satisfy: 0.1<f1/R1<0.2.

In an exemplary embodiment, the optical imaging lens assembly may satisfy: −3.0<R10/R9<−2.0, where R10 is a radius of curvature of an image-side surface of the fifth lens and R9 is a radius of curvature of an object-side surface of the fifth lens. The optical imaging lens assembly satisfies: −3.0<R10/R9<−2.0, which can achieve the effect of increasing an aperture of the optical imaging lens assembly. More specifically, R10 and R9 may satisfy: −2.6<R10/R9<−2.2.

In an exemplary embodiment, the optical imaging lens assembly may satisfy: −11<f/(R5−R6)<15, where f is a total effective focal length of the optical imaging lens assembly, R5 is a radius of curvature of an object-side surface of the third lens and R6 is a radius of curvature of an image-side surface of the third lens. The optical imaging lens assembly satisfies: 11<f/(R5−R6)<15, which is conducive to reducing the optical distortion of the optical imaging lens assembly, thereby improving the imaging quality of the lens assembly. More specifically, f, R5 and R6 may satisfy: 11.0<f/(R5−R6)<13.5.

In an exemplary embodiment, the optical imaging lens assembly may satisfy: −2.5<DT11/EPD<3.5, where DT11 is an effective radius of the object-side surface of the first lens and EPD is an entrance pupil diameter of the optical imaging lens assembly. By reasonably controlling the size of the first lens, the effect of increasing the aperture of the optical imaging lens assembly can be achieved thereby increasing the amount of light entering the lens assembly. More specifically, DT11 and EPD may satisfy: 2.80<DT11/EPD<3.40.

In an exemplary embodiment, the optical imaging lens assembly may further include a stop, which may be disposed at an appropriate position as needed, for example, may be disposed between the third lens and the fourth lens. Alternatively, the optical imaging lens assembly may further include an optical filter for correcting the color deviation and/or a protective glass for protecting the photosensitive element on the imaging plane.

The optical imaging lens assembly according to the above embodiments of the present disclosure may adopt multiple lenses, for example, the above seven lenses. By reasonably distributing the refractive power, surface type, center thickness of each lens and the axial distances between the lenses, the size and sensitivity of the optical imaging lens assembly can be effectively reduced and the processability of a group of optical imaging lenses can be effectively improved, which is conducive for the optical imaging lens assembly to be produced and processed and be suitable for portable electronic products. The optical imaging lens assembly according to the embodiments of the present disclosure can have an ultra-wide-angle while improving an imaging quality.

In the embodiments of the present disclosure, at least one of the surfaces of the lenses is an aspherical lens, that is, at least one of the surfaces from the object-side surface of the first lens to the image-side surface of the seventh lens is an aspheric surface. An aspheric lens is characterized by a continuous change in curvature from the center of the lens to the periphery of the lens. Unlike a spherical lens, which has a constant curvature from the center of the lens to the periphery of the lens, an aspheric lens has better characteristics about radius of curvature and has the advantages of improving a distortion and an astigmatic aberration. With the aspheric lens, aberrations occurring during imaging can be eliminated as much as possible, thereby improving the imaging quality. Alternatively, at least one of the object-side surfaces and the image-side surfaces of the first lens, the second lens, the third lens, the fourth lens, the fifth lens, the sixth lens, and the seventh lens is an aspheric surface. Alternatively, all of the object-side surfaces and the image-side surfaces of the first lens, the second lens, the third lens, the fourth lens, the fifth lens, the sixth lens, and the seventh lens are aspheric surfaces.

However, it will be understood by those skilled in the art that the number of lenses constituting the optical imaging lens assembly may be varied to achieve the various results and advantages described herein without departing from the technical solutions claimed by the present disclosure. For example, although some embodiments are described by taking seven lenses as an example, the optical imaging lens assembly is not limited to include seven lenses. The optical imaging lens assembly may alternatively include other numbers of lenses as needed.

Some specific examples of an optical imaging lens assembly applicable to the above embodiments will be further described below with reference to the accompanying drawings.

Example 1

An optical imaging lens assembly according to example 1 of the present disclosure is described below with reference to FIGS. 1 to 2D. FIG. 1 shows a schematic structural diagram of the optical imaging lens assembly according to example 1 of the present disclosure.

As shown in FIG. 1, the optical imaging lens assembly includes a first lens E1, a second lens E2, a third lens E3, a stop STO, a fourth lens E4, a fifth lens E5, a sixth lens E6, a seventh lens E7, and an optical filter E8, which are sequentially arranged along an optical axis from an object side to an image side of the optical imaging lens assembly.

The first lens E1 has a negative refractive power, and an object-side surface S1 thereof is a concave surface and an image-side surface S2 thereof is a concave surface. The second lens E2 has a positive refractive power, and an object-side surface S3 thereof is a convex surface and an image-side surface S4 thereof is a convex surface. The third lens E3 has a negative refractive power, and an object-side surface S5 thereof is a concave surface and an image-side surface S6 thereof is a convex surface. The fourth lens EA has a positive refractive power, and an object-side surface S7 thereof is a convex surface and an image-side surface S8 thereof is a convex surface. The fifth lens E5 has a negative refractive power, and an object-side surface S9 thereof is a concave surface and an image-side surface S10 thereof is a concave surface. The sixth lens E6 has a positive refractive power, and an object-side surface S11 thereof is a concave surface and an image-side surface S12 thereof is a convex surface. The seventh lens E7 has a positive refractive power, and an object-side surface S13 thereof is a convex surface and an image-side surface S14 thereof is a concave surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

Table 1 shows basic parameters of the optical imaging lens assembly of example 1, where the units for the radius of curvature, the thickness and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −18.1721 | 0.2100 | 1.546 | 56.09 | −2.30 | 0.000 |
| S2 | Aspheric | 1.3541 | 0.7166 | | | | −1.000 |
| S3 | Aspheric | 7.0395 | 0.7609 | 1.677 | 19.24 | 6.99 | 0.000 |

TABLE 1-continued

| Surface number | Surface type | Radius of curvature | Thickness/ Distance | Material Refractive index | Abbe number | Focal length | Conic coefficient |
|---|---|---|---|---|---|---|---|
| S4 | Aspheric | −13.7769 | 0.1909 | | | | 0.000 |
| S5 | Aspheric | −2.1070 | 0.3744 | 1.546 | 56.09 | −294.70 | 0.000 |
| S6 | Aspheric | −2.2690 | 0.0300 | | | | 0.000 |
| STO | Spherical | Infinite | 0.0218 | | | | |
| S7 | Aspheric | 2.3413 | 0.6369 | 1.546 | 56.09 | 2.18 | 0.000 |
| S8 | Aspheric | −2.1818 | 0.5581 | | | | 0.000 |
| S9 | Aspheric | −2.8691 | 0.3937 | 1.677 | 19.24 | −2.97 | 0.000 |
| S10 | Aspheric | 7.1111 | 0.1192 | | | | 0.000 |
| S11 | Aspheric | −1.9612 | 0.7180 | 1.537 | 55.71 | 4.62 | 0.000 |
| S12 | Aspheric | −1.2352 | 0.0300 | | | | −1.000 |
| S13 | Aspheric | 2.9878 | 0.9147 | 1.537 | 55.71 | 8.58 | 0.000 |
| S14 | Aspheric | 7.5947 | 1.0750 | | | | 0.000 |
| S15 | Spherical | Infinite | 0.2100 | 1.518 | 64.17 | | |
| S16 | Spherical | Infinite | 0.5399 | | | | |
| S17 | Spherical | Infinite | | | | | |

In example 1, the total effective focal length f of the optical imaging lens assembly is 1.86 mm, the axial distance TTL from the object-side surface S1 of the first lens E11 to the imaging plane S17 is 7.50 mm, and the maximal field-of-view FOV is 166.3°.

In example 1, the object-side surface and the image-side surface of each one of the first lens E1 to the seventh lens E7 are both aspheric. The surface type x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18, A20, A22, A24, A26, A28 and A30 applicable to each aspheric surface S1 to S14 in example 1.

TABLE 2

| Surface number | A4 | A6 | A8 | A10 | A12 | A14 | A16 |
|---|---|---|---|---|---|---|---|
| S1 | 5.1838E−01 | −6.0506E−02 | 1.8758E−02 | −8.1418E−03 | 3.8374E−03 | −2.1810E−03 | 1.2881E−03 |
| S2 | 1.8927E−01 | 2.5635E−02 | 1.0733E−02 | 7.4881E−04 | 1.0664E−03 | −3.8634E−05 | 4.2909E−05 |
| S3 | −1.6556E−01 | 1.6632E−02 | 1.6252E−03 | −3.0469E−04 | −2.2695E−05 | −2.8480E−06 | 1.1822E−05 |
| S4 | 1.8746E−02 | 3.7356E−03 | 5.1669E−04 | 2.4372E−05 | 5.2649E−06 | −2.5902E−05 | 4.4311E−06 |
| S5 | −1.3831E−03 | −4.8602E−03 | 7.3038E−04 | 1.5742E−05 | −7.5925E−06 | −9.8604E−07 | −4.5063E−07 |
| S6 | −1.4072E−02 | 1.4760E−03 | 3.4568E−04 | 3.5882E−05 | 1.7229E−05 | −8.2332E−06 | 8.2256E−06 |
| S7 | −1.0987E−02 | 2.4968E−03 | −1.0744E−04 | 6.3316E−05 | −1.3294E−05 | 8.3668E−06 | −1.2356E−06 |
| S8 | −2.1516E−02 | 2.2951E−03 | 3.5522E−04 | 8.8468E−05 | 1.0305E−05 | −9.5102E−07 | −1.4224E−06 |
| S9 | −2.2053E−01 | 2.1589E−02 | −1.5409E−03 | −6.6939E−04 | −9.5751E−05 | 5.3371E−07 | −2.2218E−05 |
| S10 | −1.9993E−01 | 6.4021E−02 | −1.2641E−02 | 1.8159E−03 | −2.8089E−04 | 9.8905E−05 | −9.8437E−05 |
| S11 | 5.2143E−01 | −5.5503E−02 | 4.6609E−03 | −1.8085E−03 | −3.3760E−04 | 2.0555E−04 | −1.1323E−04 |
| S12 | 3.7096E−01 | 4.2564E−03 | −2.3108E−02 | −8.1400E−03 | −4.4585E−04 | −6.9777E−04 | 3.4469E−04 |
| S13 | −1.3236E+00 | 1.1480E−01 | −5.0727E−02 | 1.1457E−02 | 1.7893E−03 | −1.8951E−03 | 9.7634E−04 |
| S14 | −8.0611E−01 | 1.4561E−01 | −6.6387E−02 | 2.0038E−02 | 3.9483E−03 | −1.7248E−03 | 8.4645E−04 |

| Surface number | A18 | A20 | A22 | A24 | A26 | A28 | A30 |
|---|---|---|---|---|---|---|---|
| S1 | −7.4301E−04 | 4.1545E−04 | −2.0884E−04 | 1.1337E−04 | −6.2096E−05 | 3.5501E−05 | −1.6090E−05 |
| S2 | 1.0485E−04 | −4.7133E−05 | 3.9221E−05 | −3.7610E−05 | 1.5822E−05 | −3.4421E−05 | 2.5088E−05 |
| S3 | −1.2367E−06 | −3.6093E−07 | −4.5036E−06 | 1.9395E−07 | 2.3888E−06 | −1.2279E−06 | 1.7975E−06 |
| S4 | −9.0426E−07 | 9.0616E−06 | 5.3008E−07 | 3.1823E−06 | −2.6262E−06 | −2.0313E−06 | −2.3868E−06 |
| S5 | 2.4948E−06 | −5.1705E−07 | 7.2954E−07 | −7.7831E−07 | −6.9182E−07 | 9.5243E−07 | −2.2433E−07 |
| S6 | −7.3290E−06 | 4.2086E−06 | −3.1414E−06 | 3.6483E−06 | −1.9923E−06 | 1.0607E−06 | −3.2334E−07 |
| S7 | 2.3333E−06 | −1.3506E−06 | 4.4929E−07 | 1.5698E−08 | 8.0661E−08 | 3.2264E−09 | −1.7219E−08 |
| S8 | −8.7857E−07 | 1.0383E−06 | 1.5773E−07 | 1.2658E−07 | 5.7943E−08 | 1.9694E−08 | 2.0618E−08 |
| S9 | 1.0446E−05 | 1.6727E−06 | 8.6881E−06 | −2.8520E−06 | 1.8927E−06 | −1.9863E−06 | 1.2198E−06 |
| S10 | 5.9372E−05 | −1.4394E−05 | −1.3131E−05 | 9.0671E−06 | 1.3726E−06 | −7.0330E−06 | 5.5171E−06 |
| S11 | 9.9799E−05 | −1.3948E−05 | −3.1932E−05 | 1.8611E−05 | −2.0428E−06 | −1.1371E−05 | 2.9896E−06 |
| S12 | −7.8194E−05 | 1.2268E−04 | −7.4242E−05 | 5.2268E−05 | −1.9344E−05 | 4.5325E−05 | −3.8507E−05 |
| S13 | −6.8535E−04 | 2.2451E−04 | −9.5810E−06 | 2.3310E−04 | −2.6355E−05 | 6.7663E−06 | −9.6411E−05 |
| S14 | −2.6666E−04 | −2.7744E−04 | −1.4241E−04 | 2.2575E−04 | 6.6486E−05 | 3.4205E−05 | −8.0187E−05 |

Figures 2A, 2B:
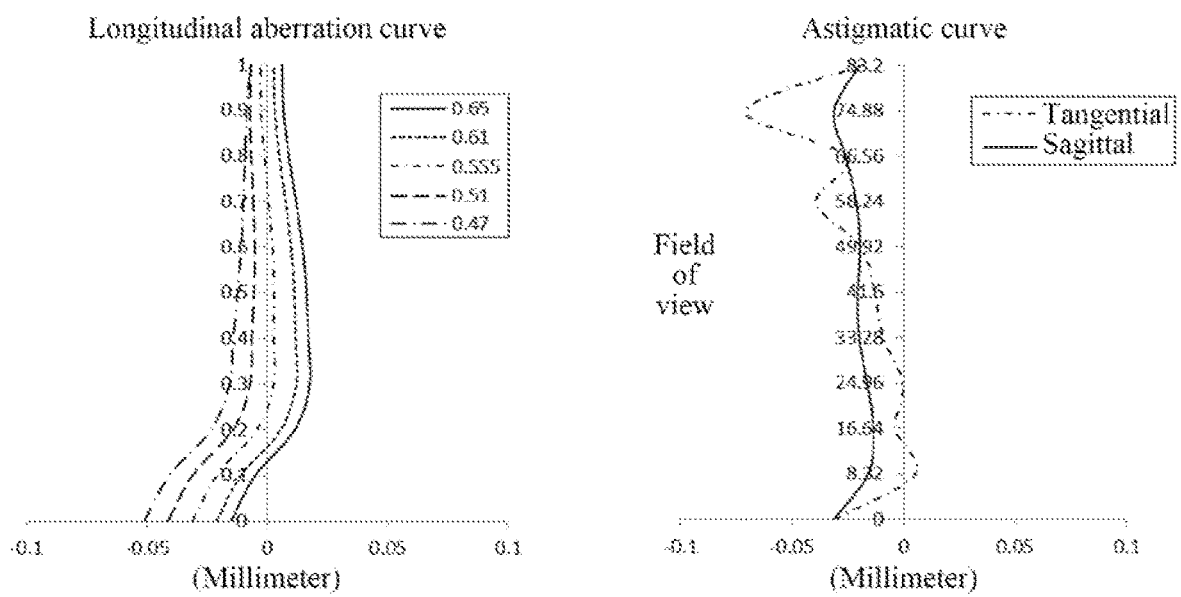
FIGS. 2A to 2D illustrate a longitudinal aberration curve, an astigmatic curve, a distortion curve, and a lateral color curve of the optical imaging lens assembly of Example 1, respectively.
Figure 2C:
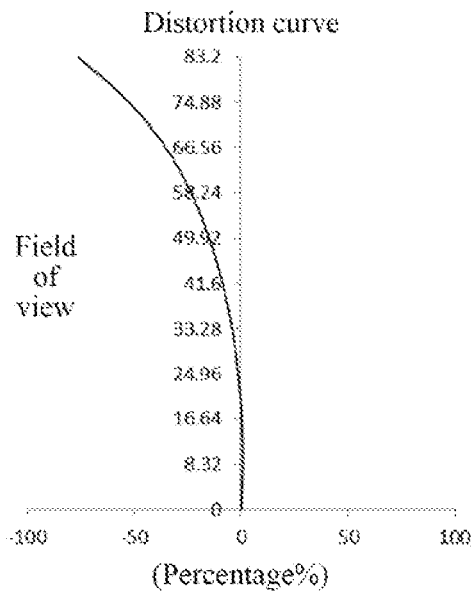
Figure 2D:
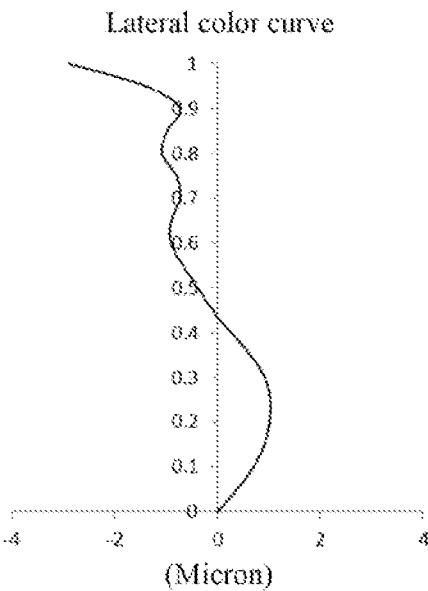

FIG. 2A illustrates a longitudinal aberration curve of the optical imaging lens assembly according to example 1, representing deviations of focal points converged by lights of different wavelengths which pass through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different field-of-views. FIG. 2D illustrates a lateral color curve of the optical imaging lens assembly according to example 1, representing deviations of different heights of images on an imaging plane formed by light passing through the lens assembly. It can be seen from FIG. 2A to FIG. 2D that the optical imaging lens assembly provided in example 1 may achieve a good imaging quality.

Example 2

Figure 3:
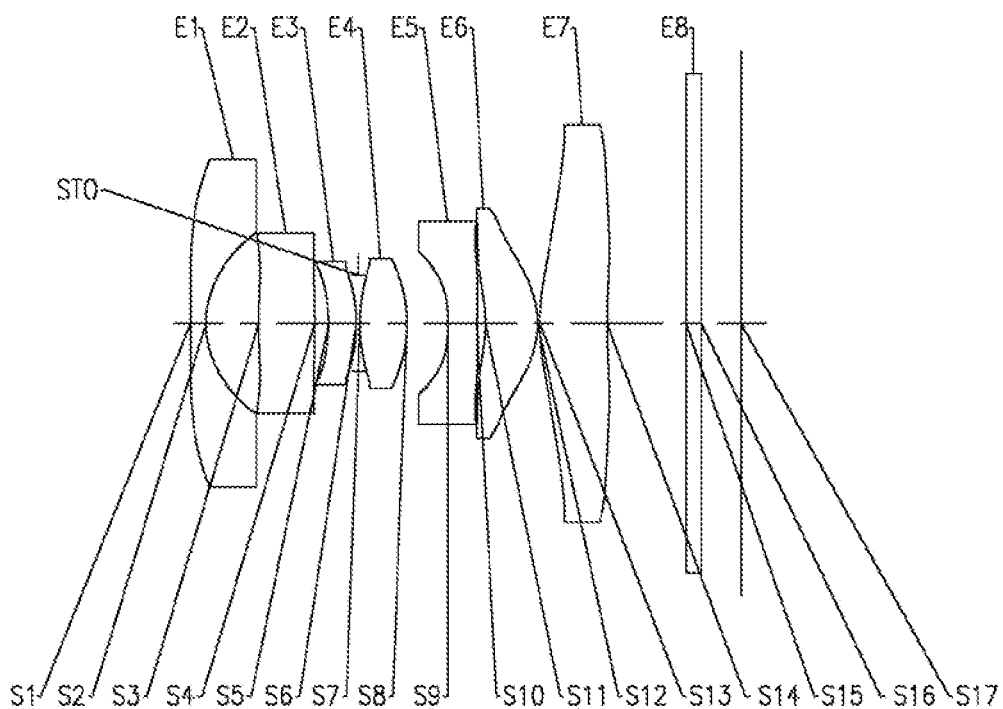
FIG. 3 is a schematic structural diagram showing an optical imaging lens assembly according to Example 2 of the present disclosure.

An optical imaging lens assembly according to example 2 of the present disclosure is described below with reference to FIGS. 3 to 4D. In this example and the following examples, for brevity, the description of parts similar to those in example 1 will be omitted. FIG. 3 shows a schematic structural diagram of the optical imaging lens assembly according to example 2 of the present disclosure.

As shown in FIG. 3, the optical imaging lens assembly includes a first lens E1, a second lens E2, a third lens E3, a stop STO, a fourth lens E4, a fifth lens E5, a sixth lens E6, a seventh lens E7, and an optical filter E8, which are sequentially arranged along an optical axis from an object side to an image side of the optical imaging lens assembly.

The first lens E1 has a negative refractive power, and an object-side surface S1 thereof is a concave surface and an image-side surface S2 thereof is a concave surface. The second lens E2 has a positive refractive power, and an object-side surface S3 thereof is a convex surface and an image-side surface S4 thereof is a convex surface. The third lens E3 has a negative refractive power, and an object-side surface S5 thereof is a concave surface and an image-side surface S6 thereof is a convex surface. The fourth lens E4 has a positive refractive power, and an object-side surface S7 thereof is a convex surface and an image-side surface S8 thereof is a convex surface. The fifth lens E5 has a negative refractive power, and an object-side surface S9 thereof is a concave surface and an image-side surface S10 thereof is a concave surface. The sixth lens E6 has a positive refractive power, and an object-side surface S11 thereof is a concave surface and an image-side surface S12 thereof is a convex surface. The seventh lens E7 has a positive refractive power, and an object-side surface S13 thereof is a convex surface and an image-side surface S14 thereof is a concave surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

In example 2, the total effective focal length f of the optical imaging lens assembly is 1.86 mm, the axial distance TTL from the object-side surface S1 of the first lens E1 to the imaging plane S17 is 7.50 mm, and the maximal field-of-view FOV is 166.5°.

Table 3 shows basic parameters of the optical imaging lens assembly of example 2, where the units for the radius of curvature, the thickness and the focal length are millimeter (mm). Table 4 shows high-order coefficients applicable to each aspheric surface in example 2, where the surface shape of each aspheric surface may be defined by the formula (1) given in the above example 1.

TABLE 3

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −17.2328 | 0.2100 | 1.546 | 56.09 | −2.28 | 0.000 |
| S2 | Aspheric | 1.3492 | 0.7166 | | | | −1.000 |
| S3 | Aspheric | 6.8868 | 0.7609 | 1.677 | 19.24 | 6.93 | 0.000 |
| S4 | Aspheric | −14.0320 | 0.1909 | | | | 0.000 |
| S5 | Aspheric | −2.0937 | 0.3744 | 1.546 | 56.09 | −276.34 | 0.000 |
| S6 | Aspheric | −2.2573 | 0.0300 | | | | 0.000 |
| STO | Spherical | Infinite | 0.0218 | | | | |
| S7 | Aspheric | 2.3430 | 0.6369 | 1.546, | 56.09 | 2.18 | 0.000 |
| S8 | Aspheric | −2.1792 | 0.5581 | | | | 0.000 |
| S9 | Aspheric | −2.8621 | 0.3937 | 1.677 | 19.24 | −2.94 | 0.000 |
| S10 | Aspheric | 6.8677 | 0.1192 | | | | 0.000 |
| S11 | Aspheric | −1.9819 | 0.7180 | 1.537 | 55.71 | 4.65 | 0.000 |
| S12 | Aspheric | −1.2439 | 0.0300 | | | | −1.000 |
| S13 | Aspheric | 2.9603 | 0.9147 | 1.537 | 55.71 | 8.31 | 0.000 |
| S14 | Aspheric | 7.8634 | 1.0750 | | | | 0.000 |
| S15 | Spherical | Infinite | 0.2100 | 1.518 | 64.17 | | |
| S16 | Spherical | Infinite | 0.5399 | | | | |
| S17 | Spherical | Infinite | | | | | |

TABLE 4

| Surface number | A4 | A6 | A8 | A10 | A12 | A14 | A16 |
|---|---|---|---|---|---|---|---|
| S1 | 5.3086E−01 | −6.3599E−02 | 2.0001E−02 | −8.7746E−03 | 4.2135E−03 | −2.4301E−03 | 1.4214E−03 |
| S2 | 2.0131E−01 | 2.8577E−02 | 1.2424E−02 | 9.7804E−04 | 1.3705E−03 | 5.4248E−05 | 6.6544E−05 |
| S3 | −1.6703E−01 | 1.6718E−02 | 1.6707E−03 | −3.3334E−04 | 8.5126E−06 | −2.9867E−05 | 2.2373E−05 |
| S4 | 1.7732E−02 | 3.9570E−03 | 4.5628E−04 | 5.7452E−05 | −1.2459E−05 | −2.3211E−05 | −1.5280E−06 |
| S5 | −1.1132E−03 | −4.8966E−03 | 7.2519E−04 | 1.8799E−05 | −8.6344E−06 | −1.9400E−06 | 3.4021E−06 |
| S6 | −1.3826E−02 | 1.3765E−03 | 3.5770E−04 | 3.6164E−05 | 2.2521E−05 | −5.2306E−06 | 9.5871E−06 |
| S7 | −1.1102E−02 | 2.4787E−03 | −1.0686E−04 | 6.9112E−05 | −1.6303E−05 | 1.0580E−05 | −4.2849E−07 |
| S8 | −2.1630E−02 | 2.2612E−03 | 3.5454E−04 | 9.2590E−05 | 1.2714E−05 | −2.6697E−07 | −3.7891E−07 |
| S9 | −2.2102E−01 | 2.1628E−02 | −1.5259E−02 | −6.4527E−04 | −7.2483E−05 | −3.3085E−06 | −3.2300E−05 |
| S10 | −2.0321E−01 | 6.4677E−02 | −1.2952E−02 | 1.9552E−03 | −3.3641E−04 | 1.2989E−04 | −1.3971E−04 |
| S11 | 5.1805E−01 | −5.5474E−02 | 4.5077E−03 | −1.7400E−03 | −4.4688E−04 | 2.6358E−04 | −1.4050E−04 |
| S12 | 3.6901E−01 | 4.3987E−03 | −2.3185E−02 | −7.8360E−03 | −5.5379E−04 | −7.4938E−04 | 3.7636E−04 |
| S13 | −1.3453E+00 | 1.1171E−01 | −5.2797E−02 | 1.1808E−02 | 1.1958E−03 | −1.8647E−03 | 1.0887E−03 |
| S14 | −7.8991E−01 | 1.4460E−01 | −6.7872E−02 | 2.1142E−02 | 3.5084E−03 | −1.8194E−03 | 1.1440E−03 |

| Surface number | A18 | A20 | A22 | A24 | A26 | A28 | A30 |
|---|---|---|---|---|---|---|---|
| S1 | −7.9434E−04 | 4.4347E−04 | −2.2388E−04 | 1.1275E−04 | −5.2609E−05 | 1.9816E−05 | −7.7553E−06 |
| S2 | 1.5487E−04 | −5.7846E−05 | 3.8188E−05 | −5.4587E−05 | 1.7502E−05 | −5.4782E−06 | 1.7377E−05 |
| S3 | −9.9605E−06 | 4.9830E−06 | −5.2493E−06 | 1.7177E−06 | 5.7491E−07 | 1.7465E−06 | 1.6703E−07 |
| S4 | 5.1493E−06 | 8.6184E−06 | 2.0533E−06 | 1.0113E−06 | −2.2171E−06 | −1.3364E−06 | −1.3620E−06 |
| S5 | 1.5650E−06 | −1.3636E−06 | −6.9106E−07 | 2.5409E−07 | 3.5582E−07 | 1.2436E−06 | −7.4456E−07 |
| S6 | −9.7195E−06 | 4.3980E−06 | −2.9190E−06 | 3.5591E−06 | −1.9455E−06 | 2.3716E−06 | −1.1911E−06 |
| S7 | 2.4727E−06 | −1.4796E−06 | 4.2685E−07 | 1.0260E−08 | 7.8568E−08 | 2.3905E−09 | −1.7941E−08 |
| S8 | −8.1539E−07 | 1.2358E−06 | 1.3714E−07 | 1.2420E−07 | 5.4873E−08 | 2.0334E−08 | 1.1204E−08 |
| S9 | 4.3148E−06 | 5.5169E−07 | 6.6132E−06 | −2.7883E−06 | 2.4672E−06 | −1.8728E−06 | 1.2436E−06 |
| S10 | 7.7479E−05 | −1.5548E−05 | −6.3210E−06 | 3.7151E−07 | 7.1145E−06 | −8.7677E−06 | 5.2857E−06 |
| S11 | 1.2848E−04 | −2.0266E−05 | −1.5735E−05 | −1.0782E−07 | 3.7135E−06 | −1.7162E−05 | 5.6000E−06 |
| S12 | 2.7198E−06 | 6.4255E−05 | −7.2812E−05 | 3.3545E−05 | −1.2683E−05 | 1.6887E−05 | −1.5566E−05 |
| S13 | −8.9251E−04 | 2.7126E−04 | 4.1865E−05 | 1.7018E−04 | −5.4143E−05 | 5.3190E−06 | −5.2757E−05 |
| S14 | −4.1251E−04 | −3.6647E−04 | 7.8348E−05 | 1.7467E−04 | −3.8962E−06 | −1.2134E−06 | −4.3072E−05 |

Figure 4A:
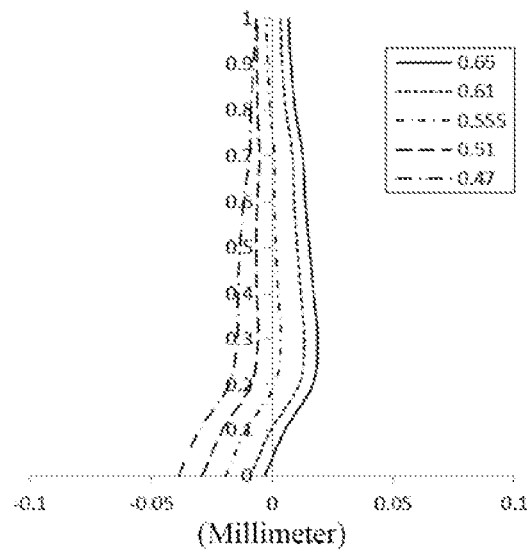
FIGS. 4A to 4D illustrate a longitudinal aberration curve, an astigmatic curve, a distortion curve, and a lateral color curve of the optical imaging lens assembly of Example 2, respectively.
Figure 4B:
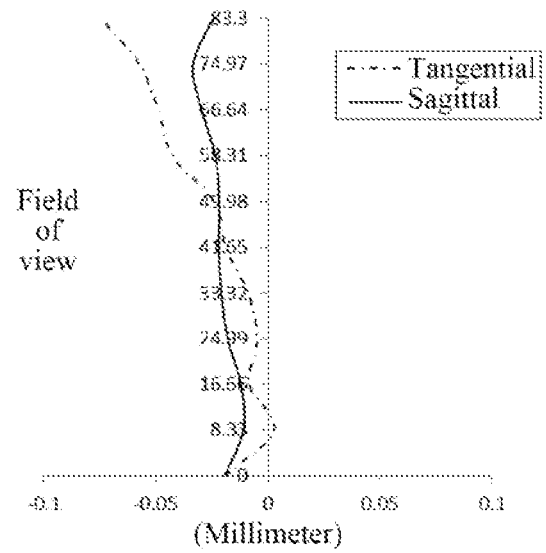
Figure 4C:
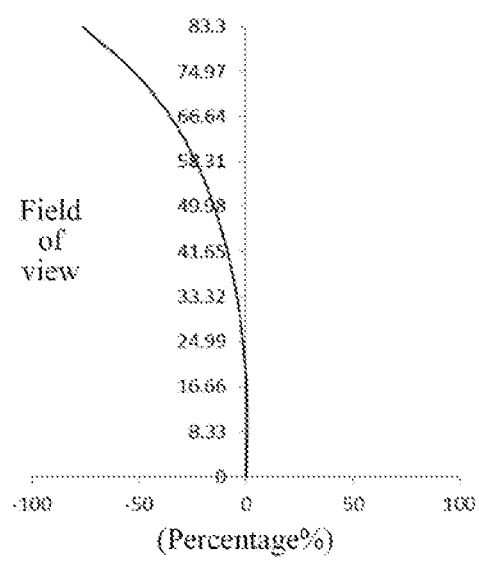
Figure 4D:
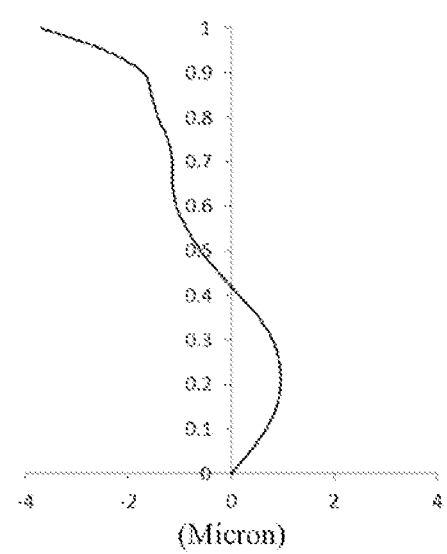

FIG. 4A illustrates a longitudinal aberration curve of the optical imaging lens assembly according to example 2, representing deviations of focal points converged by lights of different wavelengths which pass through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different field-of-views. FIG. 4D illustrates a lateral color curve of the optical imaging lens assembly according to example 2, representing deviations of different heights of images on an imaging plane formed by light passing through the lens assembly. It can be seen from FIG. 4A to FIG. 4D that the optical imaging lens assembly provided in example 2 may achieve a good imaging quality.

Example 3

Figure 5:
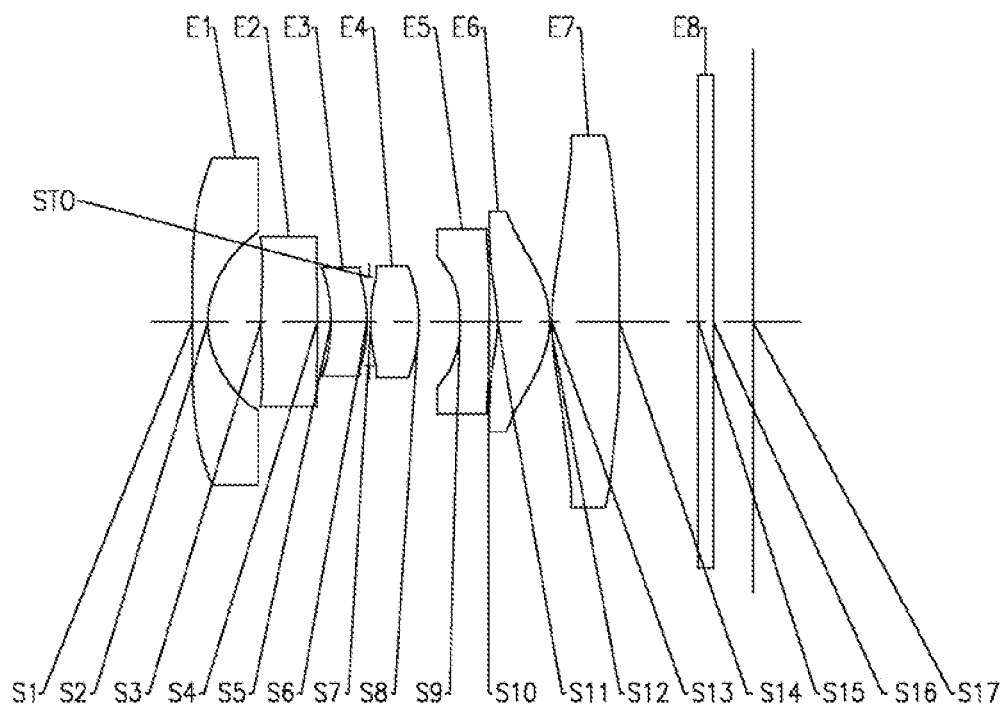
FIG. 5 is a schematic structural diagram showing an optical imaging lens assembly according to Example 3 of the present disclosure.

An optical imaging lens assembly according to example 3 of the present disclosure is described below with reference to FIGS. 5 to 6D. FIG. 5 shows a schematic structural diagram of the optical imaging lens assembly according to example 3 of the present disclosure.

As shown in FIG. 5, the optical imaging lens assembly includes a first lens E1, a second lens E2, a third lens E3, a stop STO, a fourth lens E4, a fifth lens E5, a sixth lens E6, a seventh lens E7, and an optical filter E8, which are sequentially arranged along an optical axis from an object side to an image side of the optical imaging lens assembly.

The first lens E1 has a negative refractive power, and an object-side surface S1 thereof is a concave surface and an image-side surface S2 thereof is a concave surface. The second lens E2 has a positive refractive power, and an object-side surface S3 thereof is a convex surface and an image-side surface S4 thereof is a convex surface. The third lens E3 has a positive refractive power, and an object-side surface S5 thereof is a concave surface and an image-side surface S6 thereof is a convex surface. The fourth lens E4 has a positive refractive power, and an object-side surface S7 thereof is a convex surface and an image-side surface S8 thereof is a convex surface. The fifth lens E5 has a negative refractive power, and an object-side surface S9 thereof is a concave surface and an image-side surface S10 thereof is a concave surface. The sixth lens E6 has a positive refractive power, and an object-side surface S11 thereof is a concave surface and an image-side surface S12 thereof is a convex surface. The seventh lens E7 has a positive refractive power, and an object-side surface S13 thereof is a convex surface and an image-side surface S–thereof is a concave surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

In example 3, the total effective focal length f of the optical imaging lens assembly is 1.67 mm, the axial distance TTL from the object-side surface S1 of the first lens E1 to the imaging plane S17 is 7.64 mm, and the maximal field-of-view FOV is 175.2°.

Table 5 shows basic parameters of the optical imaging lens assembly of example 3, where the units for the radius of curvature, the thickness and the focal length are millimeter (mm). Table 6 shows high-order coefficients applicable to each aspheric surface in example 3, where the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −14.6416 | 0.2100 | 1.546 | 56.09 | −2.12 | 0.000 |
| S2 | Aspheric | 1.2635 | 0.7239 | | | | −1.000 |
| S3 | Aspheric | 6.8599 | 0.7671 | 1.677 | 19.24 | 7.01 | 0.000 |
| S4 | Aspheric | −14.7006 | 0.1846 | | | | 0.000 |
| S5 | Aspheric | −2.2471 | 0.4863 | 1.546 | 56.09 | 217.04 | 0.000 |
| S6 | Aspheric | −2.3738 | 0.0300 | | | | 0.000 |
| STO | Spherical | Infinite | 0.0218 | | | | |
| S7 | Aspheric | 2.3265 | 0.6555 | 1.546 | 56.09 | 2.18 | 0.000 |
| S8 | Aspheric | −2.1930 | 0.5581 | | | | 0.000 |
| S9 | Aspheric | −2.8293 | 0.3937 | 1.677 | 19.24 | −2.94 | 0.000 |
| S10 | Aspheric | 7.1131 | 0.1192 | | | | 0.000 |
| S11 | Aspheric | −2.0049 | 0.7180 | 1.546 | 56.09 | 4.47 | 0.000 |
| S12 | Aspheric | −1.2399 | 0.0300 | | | | −1.000 |
| S13 | Aspheric | 3.4118 | 0.9147 | 1.546 | 56.09 | 7.06 | 0.000 |
| S14 | Aspheric | 26.9262 | 1.0750 | | | | 0.000 |
| S15 | Spherical | Infinite | 0.2100 | 1.518 | 64.17 | | |
| S16 | Spherical | Infinite | 0.5399 | | | | |
| S17 | Spherical | Infinite | | | | | |

TABLE 6

| Surface number | A4 | A6 | A8 | A10 | A12 | A14 | A16 |
|---|---|---|---|---|---|---|---|
| S1 | 5.6760E−01 | −7.1940E−02 | 2.3582E−02 | −1.0408E−02 | 5.1748E−03 | −3.2167E−03 | 1.8733E−03 |
| S2 | 1.7070E−01 | 4.1102E−02 | 1.1124E−02 | 3.2917E−03 | 1.2445E−03 | 5.6372E−04 | −4.0510E−04 |
| S3 | −1.6271E−01 | 1.6588E−02 | 1.4654E−03 | −2.9851E−04 | 5.4201E−05 | −6.8516E−05 | 5.6288E−05 |
| S4 | 1.8885E−02 | 3.4651E−03 | 6.4614E−04 | 4.4072E−06 | 1.2393E−05 | −4.1294E−05 | 1.1847E−05 |
| S5 | −4.8254E−03 | −3.9875E−03 | 4.4311E−04 | 5.6608E−05 | −8.0296E−06 | 2.0320E−05 | −1.5126E−05 |
| S6 | −1.3109E−02 | 1.4366E−03 | 3.3642E−04 | 1.1894E−05 | 6.9963E−05 | −4.7627E−05 | 1.1433E−05 |
| S7 | −1.2317E−02 | 2.7250E−03 | −2.4574E−04 | 1.5282E−04 | −5.2849E−05 | 4.0932E−05 | −2.4636E−05 |
| S8 | −2.0130E−02 | 1.9488E−03 | 4.4259E−04 | 6.2661E−05 | 2.1683E−05 | −1.7915E−05 | 7.2408E−06 |
| S9 | −2.2067E−01 | 2.1981E−02 | −1.6394E−03 | −4.7498E−04 | −1.5519E−04 | 2.9897E−05 | −6.2132E−05 |
| S10 | −2.0675E−01 | 6.4306E−02 | −1.2888E−02 | 2.0011E−03 | −4.0301E−04 | 2.0160E−04 | −1.5166E−04 |
| S11 | 5.1648E−01 | −5.5068E−02 | 4.3205E−03 | −1.6245E−03 | −5.2242E−04 | 2.7498E−04 | −1.5809E−04 |
| S12 | 3.9611E−01 | −5.2393E−02 | −1.9276E−02 | −9.4450E−03 | 8.3015E−05 | −1.6833E−03 | 8.2749E−04 |
| S13 | −1.0637E+00 | 1.2144E−01 | −3.7525E−02 | 1.1542E−02 | 3.5201E−03 | −2.4430E−03 | 1.6802E−03 |
| S14 | −5.1252E−01 | 8.8843E−02 | −5.0377E−02 | 1.5245E−02 | 5.3569E−03 | −3.5854E−03 | 2.1997E−03 |

| Surface number | A18 | A20 | A22 | A24 | A26 | A28 | A30 |
|---|---|---|---|---|---|---|---|
| S1 | −1.0410E−03 | 5.9475E−04 | −2.5662E−04 | 1.1655E−04 | −5.0398E−05 | 1.0078E−05 | −8.5179E−06 |
| S2 | 5.7195E−04 | −2.4295E−04 | 2.1345E−04 | −1.9714E−04 | 5.4661E−05 | −6.1770E−05 | 4.3205E−05 |
| S3 | −3.0588E−05 | 1.5201E−05 | −1.4584E−05 | 4.7656E−06 | −1.7883E−06 | 4.4972E−06 | 2.9882E−08 |
| S4 | −7.4032E−06 | 1.3814E−05 | −2.4011E−06 | 7.1819E−06 | −3.2972E−06 | −3.8750E−07 | −3.0815E−06 |
| S5 | 5.3170E−06 | −7.2815E−07 | 8.5864E−06 | 3.0500E−07 | −2.4566E−07 | −4.7009E−06 | 2.7745E−07 |
| S6 | −1.6123E−05 | 2.2270E−05 | −4.5100E−06 | 8.5738E−06 | −3.8066E−06 | 4.8637E−06 | −6.9702E−06 |
| S7 | 1.1266E−05 | −1.2056E−05 | 1.3580E−05 | −1.1798E−06 | 6.2463E−06 | −6.6592E−06 | 1.3069E−06 |
| S8 | −2.7448E−06 | 7.8488E−06 | −5.3033E−06 | 1.4117E−06 | −1.1651E−06 | 8.4570E−07 | −2.6248E−07 |
| S9 | 2.2714E−05 | −2.9039E−05 | 1.5647E−05 | −7.0037E−06 | 1.2472E−05 | −4.6866E−06 | 3.2565E−06 |
| S10 | 7.8427E−05 | −5.9001E−05 | 4.9631E−06 | 2.5047E−06 | 1.7011E−05 | −1.1208E−05 | 9.0502E−06 |
| S11 | 1.4467E−04 | −2.6032E−05 | −1.7635E−05 | −5.6774E−06 | 1.5439E−05 | −2.4906E−05 | 9.5308E−06 |
| S12 | −3 1238E−04 | 3.5720E−04 | −1.1867E−04 | 7.8838E−05 | −9.4449E−05 | 4.5278E−05 | −2.9364E−05 |
| S13 | −1.3071E−03 | 3.3913E−04 | −1.6889E−04 | 3.6427E−04 | −8.5788E−05 | 3.5973E−05 | −4.6514E−05 |
| S14 | −5.2111E−04 | −1.7150E−04 | 1.1512E−04 | 2.1775E−04 | −2.0702E−05 | −1.1439E−04 | −5.5904E−05 |

Figures 6A, 6B:
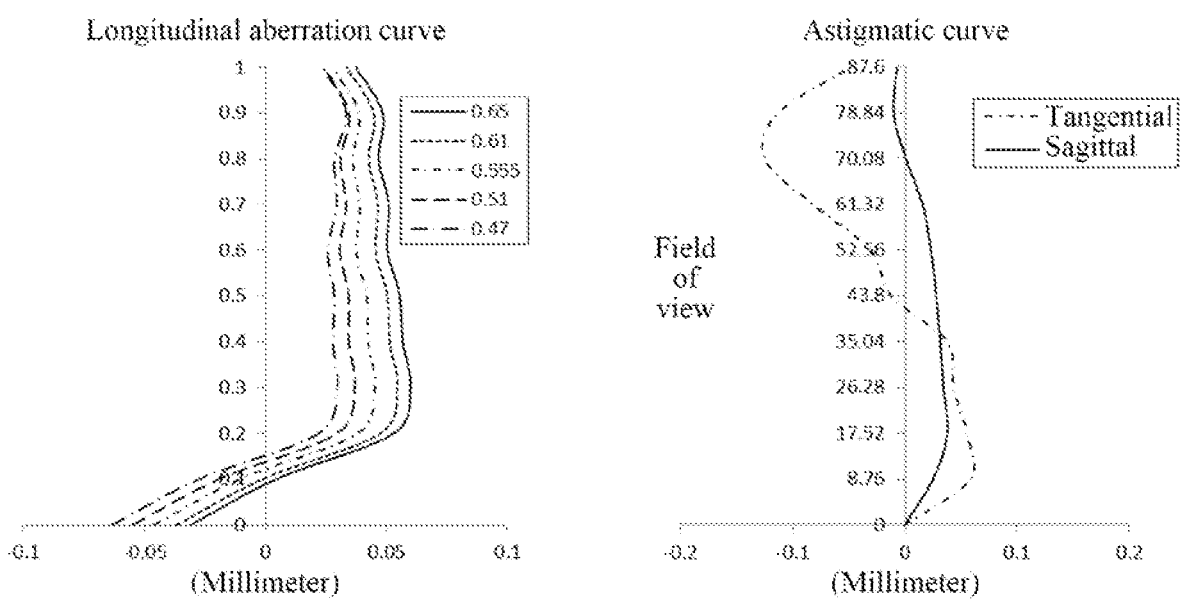
FIGS. 6A to 6D illustrate a longitudinal aberration curve, an astigmatic curve, a distortion curve, and a lateral color curve of the optical imaging lens assembly of Example 3, respectively.
Figure 6C:
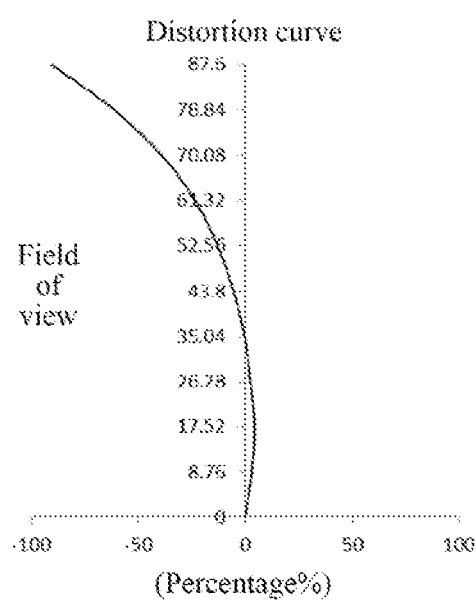
Figure 6D:
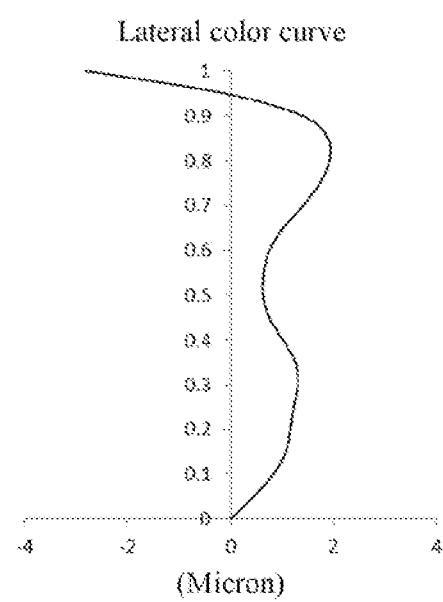

FIG. 6A illustrates a longitudinal aberration curve of the optical imaging lens assembly according to example 3, representing deviations of focal points converged by lights of different wavelengths which pass through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different field-of-views. FIG. 6D illustrates a lateral color curve of the optical imaging lens assembly according to example 3, representing deviations of different heights of images on an imaging plane formed by light passing through the lens assembly. It can be seen from FIG. 6A to FIG. 6D) that the optical imaging lens assembly provided in example 3 may achieve, a good imaging quality.

In view of the above, examples 1 to 3 respectively satisfy the relationship shown in Table 7.

TABLE 7

| Conditional | Example 1 | Example 2 | Example 3 |
|---|---|---|---|
| TTL/Tan(Semi-FOV) (mm) | 0.90 | 0.89 | 0.32 |
| f/(R11 − R12) | −2.56 | −2.51 | −2.18 |
| f7/f6 | 1.86 | 1.79 | 1.58 |
| f2/f1 | −3.04 | −3.03 | −3.31 |
| f/(f4 + f5) | −2.33 | −2.44 | −2.18 |
| f2/(R3 + R4) | −1.04 | −0.97 | −0.89 |
| f/CT2 + f/CT4 | 5.36 | 5.35 | 4.72 |
| f/T45 | 3.33 | 3.32 | 2.99 |
| f/CT7 | 2.03 | 2.03 | 1.82 |
| f1/R1 | 0.13 | 0.13 | 0.14 |
| R10/R9 | −2.48 | −2.40 | −2.51 |
| f/(R5 − R6) | 11.47 | 11.34 | 13.16 |
| DT11/EPD | 2.95 | 2.95 | 3.27 |

The present disclosure further provides an imaging apparatus whose electronic photosensitive element may be a photosensitive charge-coupled device (CCD) or a complementary metal-oxide semiconductor (CMOS) element. The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side along an optical axis, comprising:
    a first lens having a negative refractive power;
    a second lens having a positive refractive power;
    a third lens;
    a fourth lens having a positive refractive power;
    a fifth lens having a negative refractive power;
    a sixth lens having a positive refractive power; and
    a seventh lens with a convex object-side surface,
    wherein an axial distance TTL from an object-side surface of the first lens to an imaging plane of the optical imaging lens assembly and a half of a maximal field-of-view Semi-FOV of the optical imaging lens assembly satisfy: TTL/Tan(Semi-FOV)<1.0 mm; and
    a total effective focal length f of the optical imaging lens assembly, a radius of curvature R11 of an object-side surface of the sixth lens and a radius of curvature R12 of an image-side surface of the sixth lens satisfy: −5.0<f/(R11−R12)<−2.0.

2. The optical imaging lens assembly according to claim 1, wherein an effective focal length f7 of the seventh lens and an effective focal length f6 of the sixth lens satisfy: 1.0<f7/f6<2.0.

3. The optical imaging lens assembly according to claim 1, wherein an effective focal length f2 of the second lens and an effective focal length f1 of the first lens satisfy: −3.5<f2/f1≤−3.0.

4. The optical imaging lens assembly according to claim 1, wherein the total effective focal length f of the optical imaging lens assembly, an effective focal length f4 of the fourth lens and an effective focal length f5 of the fifth lens satisfy: −2.5<f/(f4+f5)<−2.0.

5. The optical imaging lens assembly according to claim 1, wherein an effective focal length f2 of the second lens, a radius of curvature R3 of an object-side surface of the second lens and a radius of curvature R4 of an image-side surface of the second lens satisfy: −1.5<2/(R3+R4)<−0.8.

6. The optical imaging lens assembly according to claim 1, wherein the total effective focal length f of the optical imaging lens assembly, an axial center thickness CT2 of the second lens and an axial center thickness CT4 of the fourth lens satisfy: 4.5<f/CT2+f/CT4<5.5.

7. The optical imaging lens assembly according to claim 1, wherein the total effective focal length f of the optical imaging lens assembly and a spaced interval T45 between the fourth lens and the fifth lens on the optical axis satisfy: 2.5<f/T45<3.5.

8. The optical imaging lens assembly according to claim 1, wherein the total effective focal length f of the optical imaging lens assembly and an axial center thickness CT7 of the seventh lens satisfy: 1.5<f/CT7<2.5.

9. The optical imaging lens assembly according to claim 1, wherein an effective focal length f1 of the firth lens and a radius of curvature R1 of an object-side surface of the first lens satisfy: 0<f1/R1<0.2.

10. The optical imaging lens assembly according to claim 1, wherein a radius of curvature R10 of an image-side surface of the fifth lens and a radius of curvature R9 of an object-side surface of the fifth lens satisfy: −3.0<R10/R9<−2.0.

11. The optical imaging lens assembly according to claim 1, wherein the total effective focal length f of the optical imaging lens assembly, a radius of curvature R5 of an object-side surface of the third lens and a radius of curvature R6 of an image-side surface of the third lens satisfy: 11<f/(R5−R6)<15.

12. The optical imaging lens assembly according to claim 1, wherein an effective radius DT11 of the object-side surface of the first lens and an entrance pupil diameter EPD of the optical imaging lens assembly satisfy: 2.5<DT11/EPD<3.5.

13. An optical imaging lens assembly, sequentially from an object side to an image side along an optical axis, comprising:
    a first lens having a negative refractive power;
    a second lens having a positive refractive power;
    a third lens;
    a fourth lens having a positive refractive power;
    a fifth lens having a negative refractive power;
    a sixth lens having a positive refractive power; and
    a seventh lens with a convex object-side surface,
    wherein an axial distance TTL from an object-side surface of the first lens to an imaging plane of the optical imaging lens assembly and a half of a maximal field-of-view Semi-FOV of the optical imaging lens assembly satisfy: TTL/Tan(Semi-FOV)<1.0 mm; and
    an effective focal length f2 of the second lens and an effective focal length f1 of the first lens satisfy: −3.5<f2/f1≤−3.0.

* * * * *